Nov. 18, 1969  J. J. CUNHA ET AL  3,479,055

LOAD DISTRIBUTING ASSEMBLY FOR WHEEL SUPPORTED VEHICLES

Filed Nov. 16, 1967  7 Sheets-Sheet 1

INVENTORS
JOSEPH J. CUNHA
THOMAS E. CONLON

Naylor & Neal
ATTORNEYS

INVENTORS
JOSEPH J. CUNHA
BY THOMAS E. CONLON
Naylor & Neal
ATTORNEYS

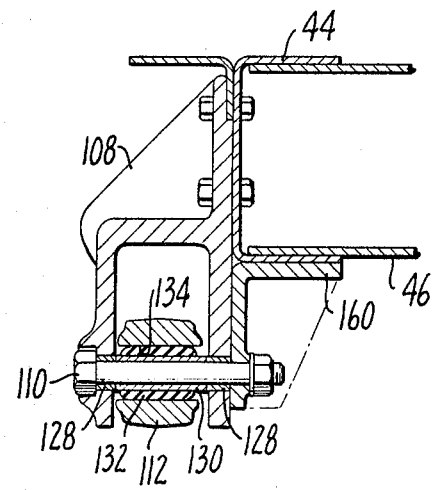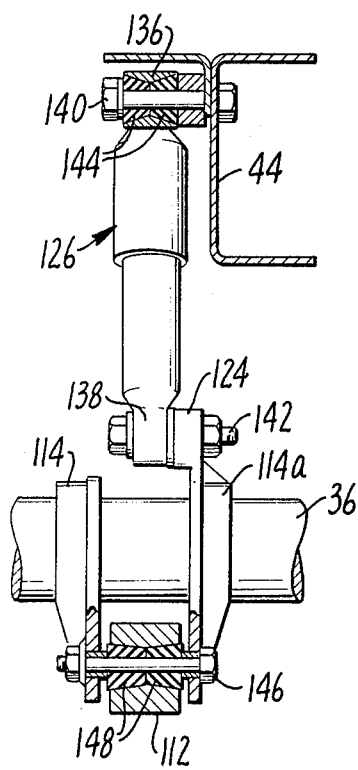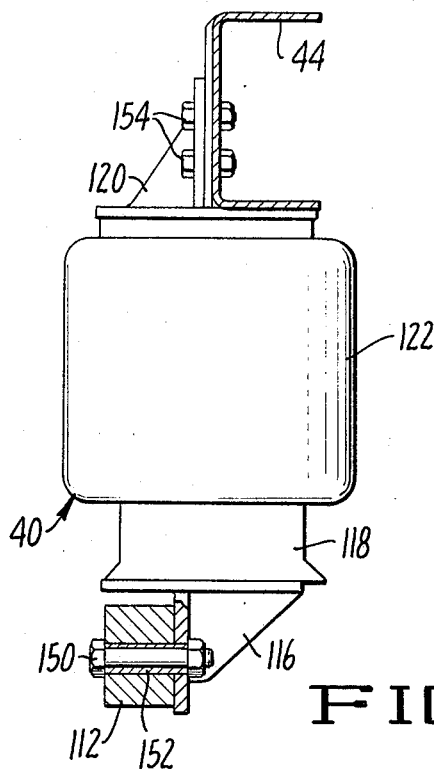

INVENTORS
JOSEPH J. CUNHA
THOMAS E. CONLON
BY Naylor & Neal
ATTORNEYS

INVENTORS
JOSEPH J. CUNHA
BY THOMAS E. CONLON
Naylor & Neal
ATTORNEYS

United States Patent Office 3,479,055
Patented Nov. 18, 1969

3,479,055
LOAD DISTRIBUTING ASSEMBLY FOR WHEEL SUPPORTED VEHICLES
Joseph J. Cunha and Thomas E. Conlon, Castro Valley, Calif., assignors to Cunha Products Incorporated, Castro Valley, Calif., a corporation of California
Filed Nov. 16, 1967, Ser. No. 683,575
Int. Cl. B60d *1/00;* B62d *53/02;* F16k *43/00*
U.S. Cl. 280—407                               12 Claims

ABSTRACT OF THE DISCLOSURE

A load distributing assembly for selectively adding a support axle to the chassis of a tractor. The assembly comprises, as its basic component, a dolly having a chassis with a wheel supported axle suspended therefrom by an air suspension system. In operation, the function of the assembly is effected by coupling the respective chassis together in load sharing relationship. This, in effect, adds the axle suspended from the chassis of the dolly to the chassis of the tractor. When the respective chassis are coupled, the air suspension system provides for selective varying of the load carried by the axle suspended from the chassis of the dolly. Mutually engageable socket and probe elements on the respective chassis maintain the chassis in load sharing relationship when coupled. The preferred embodiment of the assembly also comprises a roller support to facilitate shifting of a fifth wheel over the respective chassis, when coupled, and a service connection to automatically connect service lines on the respective chassis.

---

The present invention relates to a vehicular load distributing assembly and, more particularly, is directed to such an assembly for use with draft vehicles employed for supporting and towing semi-trailers.

In the prior art, various types of load distributing assemblies have been provided. Patent Nos. 3,246,912 and 3,312,479 are believed to represent the art most pertinent to the instant invention. These patents each disclose assemblies wherein the chassis of a dolly is coupled to the chassis of a tractor to provide additional axle support therefor. The first of these patents suggest an arrangement wherein the respective chassis of the tractor and dolly are rigidly secured together, while the second patent suggests an arrangement wherein the respective chassis are coupled together for articulation relative to each other. In both of these patents, the only suspension system disclosed for the dollies employed therein is of the leaf spring type.

The assembly to which the instant invention relates is similar to that disclosed in Patent No. 3,246,912 in that it effects load distribution by rigidly coupling the chassis of a dolly in load supporting relationship with the chassis of a tractor. It distinguishes from the patent in the suspension system used on the chassis of the dolly, the structure employed to establish a rigid connection between the respective chassis of the tractor and dolly, the service connection facility provided between the respective chassis, and the support for the fifth wheel associated with the respective chassis for movement therebetween. The air suspension system used on the chassis of the dolly has the advantage that it may be received beneath the chassis in substantially the same confines required for a spring suspension system of the type disclosed in Patent No. 3,246,912. It also has the advantage that its load carrying capacity may be changed to selectively vary the load supported by the load distributing assembly. The structure employed to establish a rigid connection between the respective chassis has the advantage that it is not dependent upon a tailored fit between a tongue on the chassis of the dolly and the socket on the chassis of the tractor for both horizontal and vertical restraint between the respective chassis. The service connection facility provided between the respective chassis has the advantage that it is self coupling and provided with means to effect its covering when not in use. The support for the fifth wheel associated with the respective chassis has the advantage that it greatly reduces the force required to move the fifth wheel, when unloaded, between the respective chassis.

It is, accordingly, a principal object of the present invention to provide a load distributing assembly of the type disclosed in Patent No. 3,246,912, which possesses the foregoing advantages relative thereto.

Another object of the invention is to provide such an assembly which may be fabricated on a mass production basis and applied to tractors having varying chassis characteristics. With respect to this object, it is a more specific object of the invention to provide such an assembly wherein the length of the dolly tongue may be readily varied without materially changing the other components of the assembly.

A further object of the invention is to provide a load distributing assembly of the type disclosed in Patent No. 3,246,912 which requires less labor to operate.

These and other objects of the invention and its specific structure and operation will become more apparent when viewed in light of the following detailed description and accompanying drawings wherein.

Figure 3:
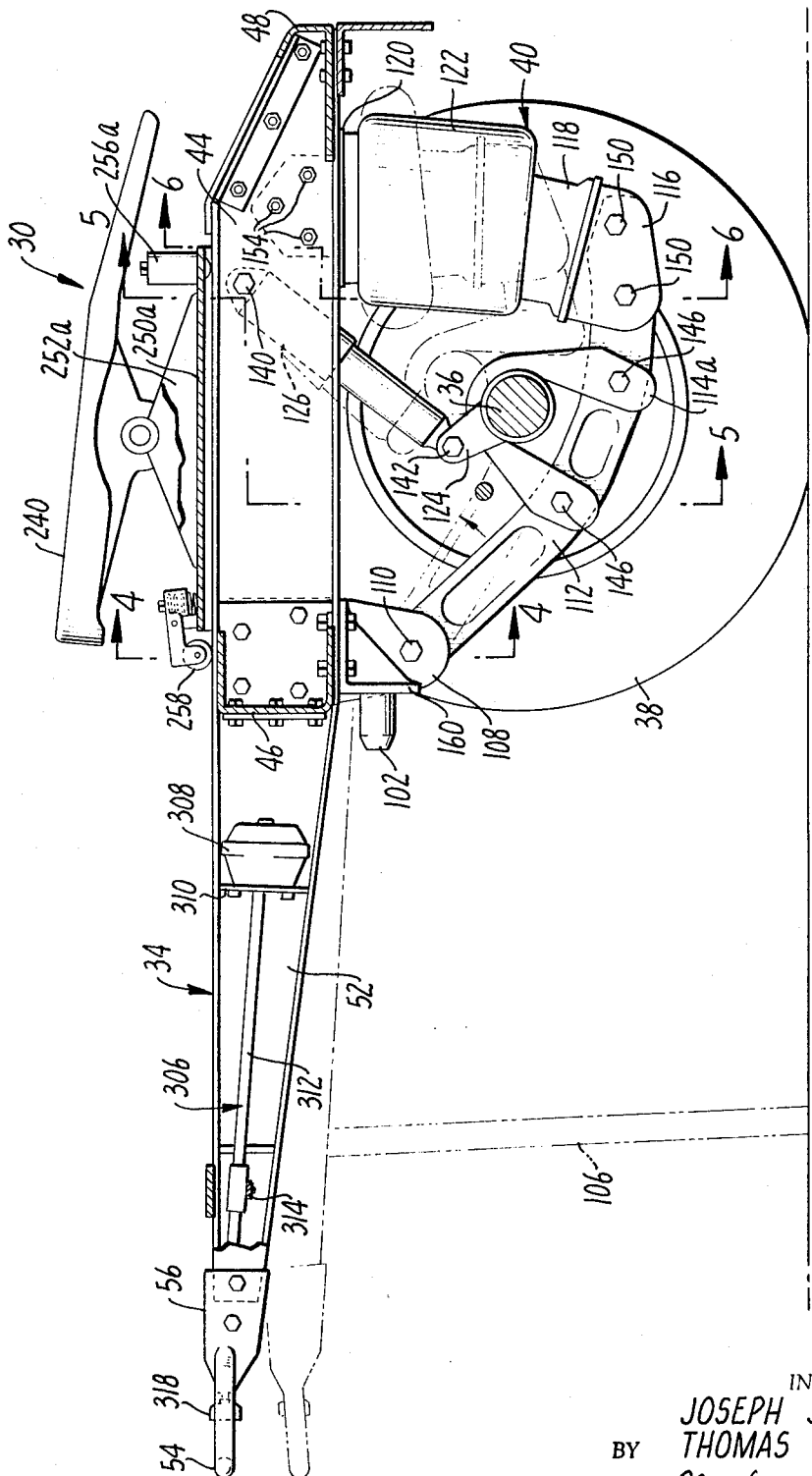
FIG. 3 is a sectional view taken on the plane designated by line 3—3 in FIG. 1.
Figure 7:
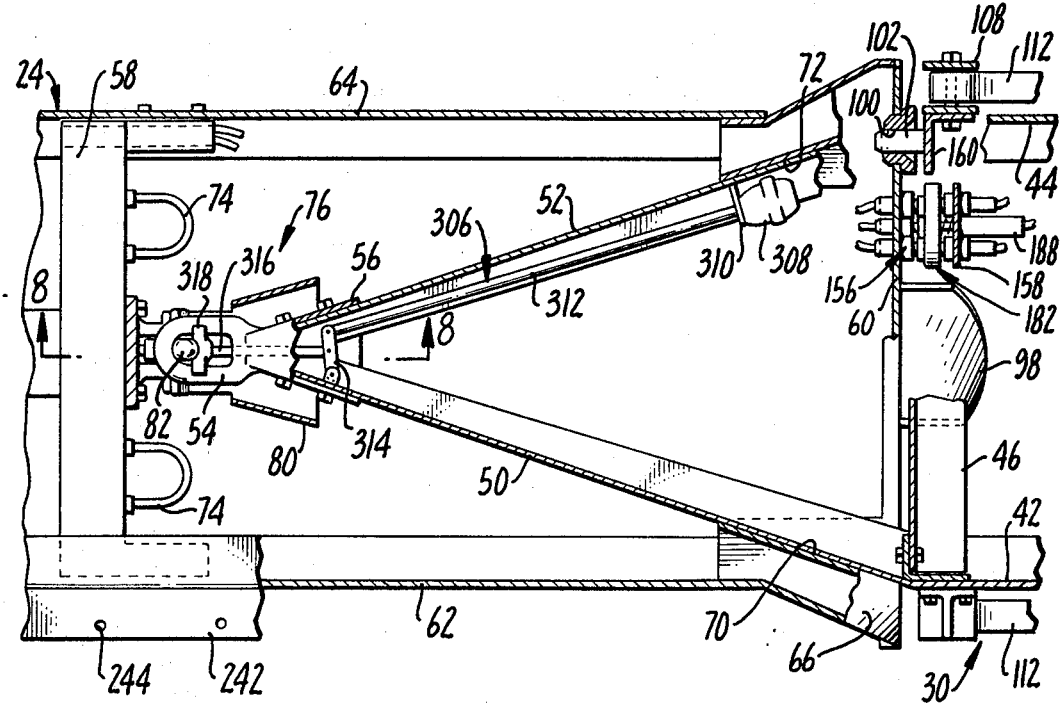
Figure 8:
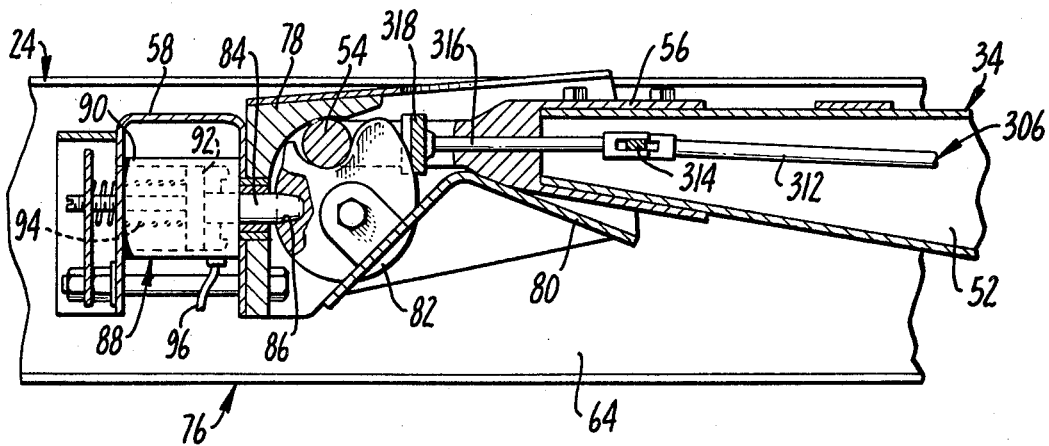
Figure 9:
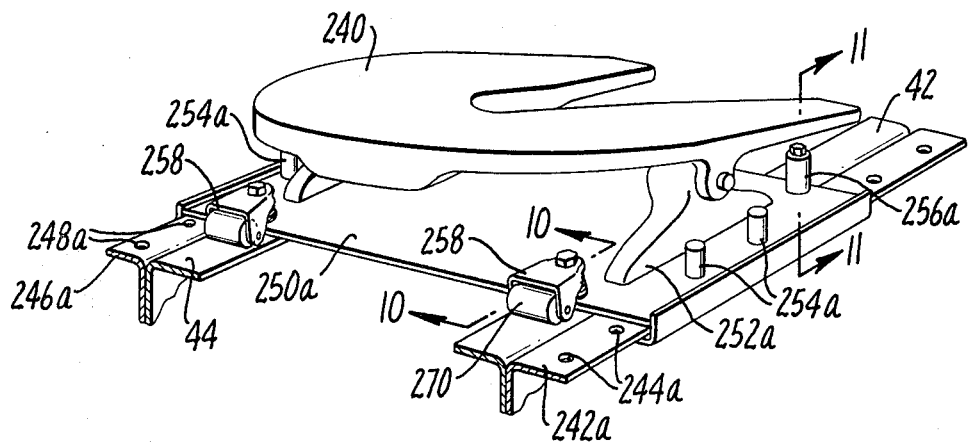
Figure 10:
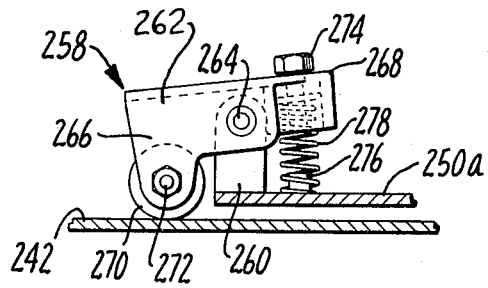
Figure 11:
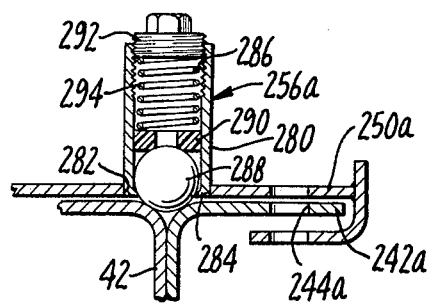
Figure 12:
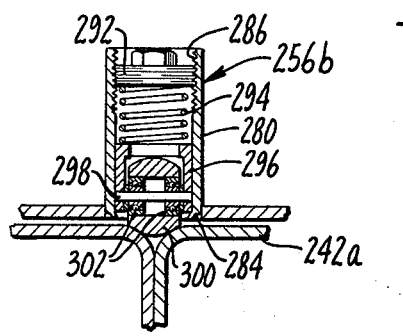
Figure 13:
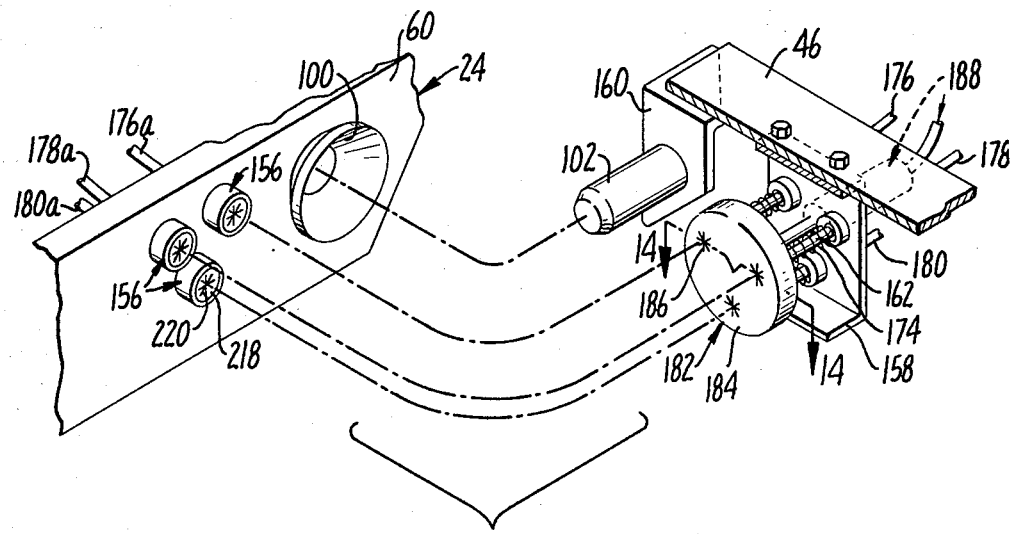
Figure 14:
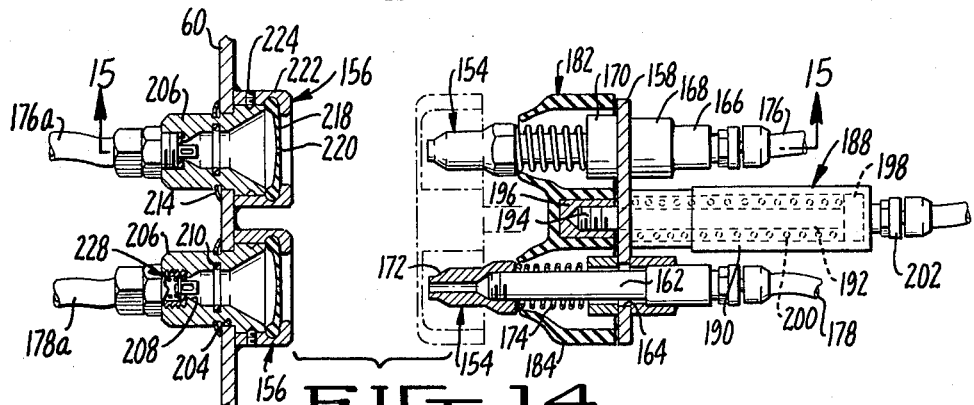
Figure 15:
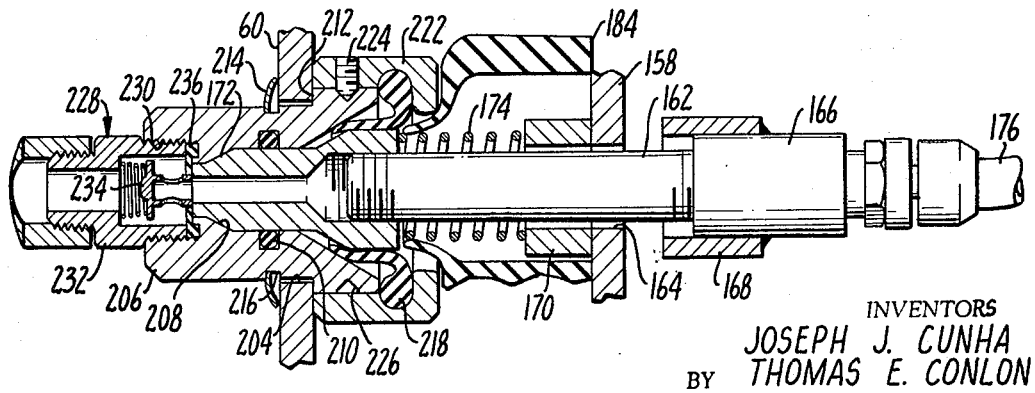

FIGS. 4, 5 and 6 are sectional views taken on the planes designated by lines 4—4, 5—5 and 6—6, respectively, in FIG. 3;

FIG. 7 is a plan view, with parts thereof broken away and shown in section, illustrating the tongue of a dolly incorporated in the assembly engaged with the tractor mounted components of the assembly;

FIG. 8 is a sectional view taken on the plane designated by line 8—8 in FIG. 7;

FIG. 9 is a partial perspective view illustrating the fifth wheel and mounting therefor provided on the dolly of the assembly;

FIGS. 10 and 11 are sectional views taken on the planes designated by lines 10—10 and 11—11, respectively, in FIG. 9;

FIG. 12 is a sectional view, corresponding to FIG. 11, illustrating a modified roller support which may be employed in place of the roller support shown in FIG. 11;

FIG. 13 is an exploded perspective view illustrating the tractor and dolly mounted components of the self-coupling service connection employed with the assembly;

FIG. 14 is a sectional view taken on the plane designated by line 14—14 of FIG. 13; and, FIG. 15 is a sectional view taken on the plane designated by line 15—15 in FIG. 14.

Figure 1:
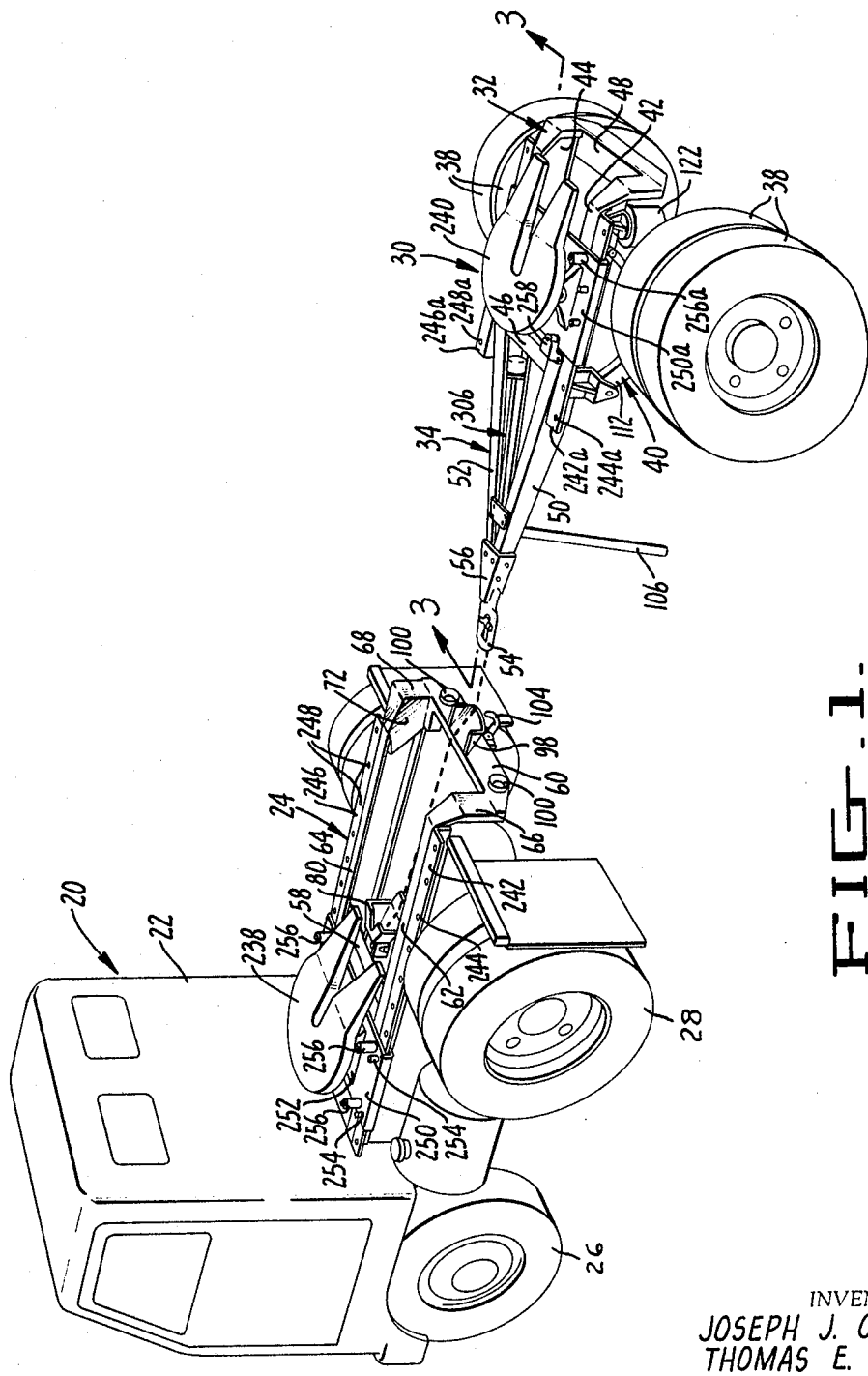
FIG. 1 is a perspective view illustrating the tractor mounted components of the assembly on a tractor, with the dolly of the assembly removed from the tractor mounted components.

Referring now to FIG. 1, the tractor therein is designated in its entirety by the numeral 20. The tractor is of relatively conventional nature in that it comprises a cab 22, chassis or frame 24 and forward and rearward wheels 26 and 28, respectively. As illustrated, the tractor 20 is of the two-axle type. The primary purpose of the load distributing assembly is to provide means whereby the tractor may be selectively converted from two to three axles and vice versa.

The dolly illustrated in the drawings is designated in its entirety by the numeral 30. Its basic components comprise: a chassis 32; a forwardly converging tongue 34 fixed to and extending from the chassis; an axle 36 supported beneath the chassis on wheels 38; and, a trailing arm air suspension system 40 suspending the chassis on the axle. The chassis 32 is made up of a rigid generally rectangular structure comprised of side frame members 42 and 44 and transverse frame members 46 and 48. The tongue 34 is comprised of lateral members 50 and 52 fixed, respectively, to the members 42 and 44. The forward end of the tongue is defined by an eye 54 formed integrally with a V-shape socket 56 received on and fixed to the forward ends of the members 50 and 52. The eye 54 forms part of the coupling provided to secure the dolly in load sharing relationship with the tractor. It should be appreciated that the effective length of the tongue 34 is determined by the spacing between the eye 54 and the socket 56 formed integrally therewith.

Load transmitting tractor-dolly connection

The connection for selectively coupling the dolly in load transmitting relationship to the tractor comprises components mounted on both the chassis of the tractor and the chassis of the dolly. When the tractor and dolly are interconnected, the components of the respective chassis mate to establish a substantially rigid interrelationship therebetween.

The basic components of the connection mounted on the tractor comprise transverse beams 58 and 60 fixed to and extending between the side frame members of the chassis 24. The latter members are designated by the numerals 62 and 64. The beam 58 extends rectilinearly between the side frame members 62 and 64 in forwardly spaced relationship to the rearward end of the chassis 24 and is of inverted U-shape cross-sectional configuration (see FIG. 8). The beam 60 is disposed beneath the level of the members 62 and 64 at the rearmost end of the chassis 24. Through this arrangement, the rearward end of the chassis 24 is open for entry of the tongue 34. Upstanding portions 66 and 68 on the ends of the beam 60 are fixed to the members 62 and 64, respectively, to fixedly secure the beam therebetween. These portions, as can be seen from FIG. 2, define forwardly converging internal surfaces at the open rearward end of the chassis 24. The latter surfaces, designated by the numerals 70 and 72, are adapted to mate with the external lateral surfaces on the tongue 34 immediately adjacent the juncture of the members 50 and 52 with the members 42 and 44.

Referring now to FIGS. 7 and 8, there it can be seen that the beam 58 carries a pair of safety chain loops 74 and a pintle hook coupling 76. The loops 74 are of conventional nature and designed to have safety chains looped therethrough for emergency purposes. The coupling 76 is designed to engage the eye 54 when the tongue 34 is received in the open rearward end of the chassis 24. The coupling comprises: a base member 78 fixedly mounted on the beam 58; a guide 80 fixed to and extending rearwardly from the base member; a pintle hook 82 rotatably mounted on the guide 80; a tapered locking pin 84 slidably received in the member 78 for selective extension into a tapered socket 86 provided therefor in the hook 82; and, a spring biased air motor 88 operatively associated with the pin 84 to effect its selective extension and retraction. The motor 88 comprises: an air cyclinder 90 mounted within the beam 58; a piston 92 slidably received within the cylinder 90 and fixed at one side thereof to the pin 84 to impart motion thereto; and, a spring 94 received in the cylinder 90 to normally urge the piston 92 to a position extending the pin 84. Air is supplied to the motor 88 to retract the pin 84 through a line 96 extending through the cylinder 90.

The beam 60 supports a centrally disposed guide 98 and a pair of sockets 100 disposed, respectively, to either side of the longitudinal center line of the chassis 24. The guide 98 is designed to direct and lift the eye 54 when the tractor 20 is backed towards the dolly 30 to effect coupling of the respective chassis 24 and 32. It also, as will become more apparent subsequently, functions to lift a support leg provided on the dolly. The sockets 100 are provided to receive pins 102 fixedly mounted on the chassis 32 of the dolly. These pins, as will become more apparent subsequently, are mutually engageable with the sockets to prevent relative elevational movement between the respective chassis. In addition to the guide 28 and sockets 100, the beam 60 also carries a pintle hook 104. This hook is of conventional nature and intended for general towing purposes when the dolly is disconnected from the tractor.

The basic components of the tractor-dolly connection mounted on the dolly 30 comprise: the eye 54; the external lateral surfaces formed on the members 50 and 52 of the tongue immediately adjacent their juncture with the members 42 and 44, respectively; and, the pins 102. In addition to these components, the components may also be said to include a retractable support leg 106 mounted on the togue 34. While this leg performs no function once the tractor and dolly are connected, it is important to the connection in that it supports the tongue in a position wherein it may be directed into the open rearward end of the chassis 24. Although the drawings do not illustrate the details of the mounting for the leg 106, it is to be understood that the leg is pivotally mounted beneath the tongue 34 for movement between the extended position illustrated in FIG. 1 and a retracted position nested between the side members 50 and 52. Movement to the retracted position is automatically effected when the leg abuts the guide 98. Preferably, the leg is also mounted for limited recilinear movement into a socket designed to maintain it in extended position when in ground engagement. When the latter arrangement is used, lifting of the tongue 34 by the guide 98 functions to disengage the leg from the socket.

In operation, connection of the dolly to the tractor is effected by backing the tractor towards the dolly to effect relative movement between the respective chassis along the dotted line illustrated in FIG. 1. During this movement, the eye 54 first engages and is lifted by the guide 98. Immediately after lifting of the eye 54, the guide 98 abuts the leg 106 and begins to swing it upwardly. As the leg is swung upwardly, continued movement of the chassis toward each other directs the eye 54 into the guide 80, which in turn, directs the eye into engagement with the pintle hook 82. Upon the latter engagement, the force imparted to the pintle hook functions to turn it from an open position (not illustrated) to the closed position illustrated in FIG. 8. Once the hook assumes the closed position, the pin 84 automatically locks it in place and, thus, the chassis are secured against separation. From FIGS. 7 and 8, it can be seen that the coupling hook 82 and base member 78 secure the eye 54 against movement relative thereto in all directions. Thus, in addition to preventing separation of the respective chassis, the coupling 76 secures the forward end of the tongue 34 against elevational and lateral movement relative to the chassis 24. As the eye 54 enters the guide 80, the external lateral surfaces of the side members 50 and 52 assume mated engagement with the surfaces 70 and 72, respectively. This, in effect, locks the respective chassis against lateral movement relative to each other. Simultaneously with this engagement, the pins 102 enter the sockets 100 to lock the respective chassis against elevational movement relative to each other.

Disconnection of the tractor and dolly is effected through a sequence which is substantially the reverse of that which occurs during connection. To effect this reverse sequence, it is simply necessary to lock the wheels of the dolly, disengage the pin 84 and drive the tractor forwardly relative to the dolly. During this operation, the eye 54 travels along the dotted line path illustrated in FIG. 1 and the leg 106 automatically drops to extended position as it passes over the guide 98. It is here noted that the aforedescribed connecting operation is also effected with the wheels of the dolly in locked condition.

Dolly suspension system

The air suspension system for the dolly comprises a pair of trailing arm suspension assemblies disposed, respectively, at either side of the chassis 32. Since these assemblies are mirror images of each other, only one will be described in detail and like numerals will be used to designate corresponding elements of the two assemblies.

The overall construction and operation of the trailing arm air assemblies can best be seen from FIG. 3. The assembly there illustrated comprises: a forward hanger 108 mounted on the frame member thereabove and having a journal bolt 110 extending therethrough; an arcuate trailing arm 112 mounted at its forward end on the journal provided by the hanger 108 and extending rearwardly beneath the axle 36; a pair of yokes 114 (only one of which is illustrated) fixed to the axle 36 and extending therearound downwardly to connections with the trailing arm 112; a first pedestal 116 mounted on the rearward end of the trailing arm 112; an air cushion piston 118 mounted on and extending upwardly from the pedestal 116; a second pedestal 120 mounted on the frame member 44 above and in alignment with the pedestal 116; an air cushion or bag 122 mounted between the pedestals 116 and 120 for operative association with the piston 118; a shock absorber bracket 124 fixed to and extending laterally from the axle 36; and, a telescoping shock absorber 126 extending between and journalled to the bracket 124 and the frame member 44. While FIG. 3 illustrates the suspension assembly therein mounted beneath the side frame member 44, it is to be understood that the corresponding assembly at the opposite side of the chassis 32 is similarly mounted beneath the side frame member 42.

The details of the mountings for the various components of the air suspension assemblies can be seen from FIGS. 4, 5 and 6. FIG. 4 shows that the bolt 110 passes through sleeves 128 received in the ears of the hanger 108 and a sleeve 130 received between the ears and having an annular rubber cushion 132 bonded thereto. The arm 112 has an aperture 134 therein force fitted on the cushion 132. Through this overall arrangement, the bolt 110 functions to clamp the sleeves 128 against the sleeve 130. Thus, rotation of the sleeve 130 is resisted by the sleeves 128 and swinging movement of the arm 112 is, in turn, resiliently resisted by the cushion 132. FIG. 5 shows that the connections between the shock absorber and the frame and axle and between the yokes 114 and the arm 112 are resilient and of relatively conventional nature. This figure also shows that the bracket 124 is fixed to the axle 36 by being integrally formed with one of the yokes, designated by the numeral 114a. The mountings for the shock absorber 126 comprises eyes 136 and 138 fixed to its telescoping elements and bolts 140 and 142, respectively, extending through the eyes. As can be seen from the upper portion of FIG. 5, the bolts are cushioned within the eyes by truncated rubber bushings, designated by the numeral 144. Bolts 146 extending through the yokes 114 and 114a and the arm 112 simliarly establish resilient connection therebetween. These bolts are surrounded by truncated rubber bushings 148 within apertures provided therefor in the arm 112.

The pedestals 116 and 120, as can be seen from FIG. 6, are simply bolted in place. The bolts for the pedestal 116 are designated by the numeral 150. As illustrated, these bolts extend through steel bushings 152. The latter arrangement is desirable in the preferred embodiment where the arms 112 are fabricated of forged aluminum. The bolts for the pedestal 120 are designated by the numeral 154. These extend directly through openings provided therefor in the pedestal and the member 44.

From FIG. 3, it can be seen that the air suspension assembly at each side of the dolly 30 is confined beneath the chassis of the dolly similarly to a conventional assembly used in a leaf spring suspension system. In manufacture, this has the advantage that a common chassis may me employed, without modification, for use with both air and spring suspension systems. With the preferred arrangement illustrated, the hanger 108 may be provided with an insert for receipt of a leaf spring and a rear leaf spring hanger may be substituted for the pedestal 120. With such a conversion, a leaf spring assembly may be readily placed beneath the chassis 32 in place of the air spring assembly. This type of conversion is facilitated, in large part, because of the configuration of the trailing arm 112. It is noted that the arm is of generally arcuate shape and extends beneath the axle 36 in concave upwardly facing relationship from a forward extremity above the axle to a rearward extremity beneath the axle. The forward extremity provides for pivoting of the arm to the hanger 108, while the rearward extremity provides for mounting of the pedestal 116.

In operation, the air spring suspension assembly functions to support the chassis 32 in much the conventional manner. The extremities of this support are shown by the solid and phantom line representations in FIG. 3. Movement of the assembly between the solid and phantom line positions results from deflection of the bag 122 responsive to load. The responsiveness of the bag may be selectively varied by changing the air pressure therein.

When the dolly is connected in load sharing relationship with a tractor, as illustrated in FIGS. 7 and 8, the load carried by the axle 36 of the dolly may be selectively varied by controlling the air pressure within the bags 122. In the preferred arrangement, control is effected by connecting air supply lines between a source on the tractor and the bags and providing suitable valving structure for the flow of air through these lines. Through the valving structure and, preferably, a pressure gauge associated therewith, the operator of the tractor may readily control the load carried by the axle 36. This, in turn, controls the load carried by the drive wheels 28 of the tractor. Thus, the operator of the tractor may selectively vary the ratio of the load carried by the drive axle of the tractor and the axle of the dolly. This characteristic may be employed to maintain the axle loads within legal limits and effect the controlled loading of the drive axle for traction purposes.

When the dolly 30 is used in a conventional manner (i.e. with the eye 54 coupled to a pintle hook for articulation relative thereto) the air suspension system is preferably controlled by a leveling valve arrangement. Such arrangements are well known in the industry and may be seen from Patent No. 2,670,201. In operation, it would simply maintain sufficient air in the bags 122 to support the chassis 32 at a predetermined level. In the preferred embodiment, air would be supplied to the bags 122 for control by the leveling valve arrangement from a source on the tractor leading the dolly.

Self-coupling service connection

FIGS. 13 to 15 show a service connection for automatically coupling service lines on the tractor 20 and dolly 30 when their respective chassis assume mated load sharing relationship. This connection comprises mutually engageable probe and socket elements 154 and 156 mounted on the respective chassis. The elements 154 are mounted on a bracket 158 fixed to and depending downwardly from the frame member 46 of the chassis 20. From FIG. 13, it can be seen that the bracket 158 is mounted adjacent the bracket supporting one of the pins 102. The latter bracket, designated by the numeral 160, is also fixed to the frame member 46. Although not illustrated, it is to be understood that each of the pins 102 is mounted on the member 46 through a bracket 160. The socket elements 156 are mounted directly in openings therefor provided in the frame members 60 of the chassis 24.

The probe elements 154 correspond identically to each other in construction and, accordingly, like numerals are employed to designate corresponding components of the elements. Each element comprises: a conduit 162 extending loosely through an aperture 164 provided therefor in the bracket 158; a conduit fitting 166 secured to the conduit 160 and having a sleeve 168 fixed thereto for abutment with the bracket 158; a bushing 170 loosely received around the conduit 162 for abutment with the bracket 158 on the side thereof opposite that facing the sleeve 168; a head 172 secured to the distal end of the conduit 162; and, a compression coil spring 174 interposed in abutting relationship between the bushing 170 and the head 172. Through the interrelationship of these components, the probe elements 154 are mounted on the bracket 158 for limited lateral movement relative thereto and for movement between extended and retracted positions as illustrated in FIGS. 14 and 15, respectively. The fittings 166 on the respective probe elements 154 are coupled in fluid communication with independent service lines, designated by the numerals 176, 178 and 180.

To protect the heads 172 from the entry of foreign matter, a shielding structure 182 is also mounted on the bracket 158. This structure comprises, as its basic element, a rubber-like cover 184 of generally circular configuration mounted for movement between extended and retracted positions relative to the heads 172, as illustrated by the phantom and solid lines, respectively, in FIG. 14. The cover 184 is provided with slit portions 186 opposite each of the heads 172 to permit the heads to pass therethrough. These portions deflect upon retraction of the cover and, upon extension of the cover, return to their closed position.

The cover 184 is mounted for movement between the extended and retracted positions by air motor 188. The motor 188 comprises: a cylinder 190 mounted on the bracket 158 between the probe elements 154; a piston rod 192 received in the cylinder 190 and extending slidably through an opening provided therefor in the bracket 158; a threaded end 194 formed on one end of the rod 192 and threadably received within an insert 196 fixed centrally within the cover 184; a piston 198 on the end of the rod 192 opposite the end 194; a compression coil spring 200 interposed in compression between the base of the cylinder connected to the bracket 158 and the piston 198; and, an air line fitting 202 secured in fluid communication with the interior of the cylinder at the end of the piston 198. In operation, the spring 200 normally maintains the cover 184 in the retracted position. The cover is moved to the extended position by supplying air to the cylinder 190 through the fitting 202.

As noted in the foregoing discussion, the socket elements 156 are mounted in openings provided therefor in the frame member 60. These openings are designated by the numeral 204. Since the elements 156 correspond identically to each other in construction, like numerals are employed to designate corresponding components of the respective elements.

Each of the socket elements 156 comprises: a body member 206 received within the opening 204 provided therefor and having a passage 208 extending therethrough for slidable receipt of one of the heads 172; and O-ring 210 mounted within a groove provided therefor in the passage 208 for slidable and sealing engagement with a head received within the passage; a shoulder 212 on the body member 206 in abutting engagement with the frame member 60; a spring fastener 214 engaged between a groove 216 provided therefor in the member 206 and the side of the frame member 60 opposite that engaged by the shoulder 212; a diaphram 218 of rubber-like material mounted over the outer end of the passage 208 and having intersecting slits 220 therein to permit the substantially unrestricted passage of a head 172 therethrough; a collar 222 received over the member 206 to secure the diaphram 218 thereto; a set screw 224 threadably received in the collar 222 and extending therefrom into engagement with a groove 226 formed in the member 206; and, a valve assembly 228 threadably received within an opening 230 provided therefor in the member 206. The valve assembly 228 is of relatively conventional nature and comprises a housing 232 having a spring biased closure member 234 mounted therein for movement between the closed and opened positions illustrated in FIGS. 14 and 15, respectively. In the closed position, the closure member 234 abuts against a resilient seat 236 mounted within the opening 230 to close the valve assembly to fluid flow. When in the closed position, the closure member 234 extends into the passage 208. As a result of the latter characteristic, and the proportioning of the passage 208, receipt of the head 172 in the passage functions to force the valve to the open position (see FIG. 15).

A comparison of FIGS. 14 and 15 illustrates that the slit portions in the diaphrams 218 are adapted to resiliently deflect in much the same manner as the slit portion in the cover 184. Thus, when the heads 172 are received within the passages 208, the diaphragms 218 resiliently deflect to an open condition. Conversely, upon removal of the heads 172 from the passages 208, the diaphrams return to the closed condition and seal the passages 208 to the entry of foreign matter.

In operation, the service connection is designed to automatically connect the service lines 176, 178 and 180 on the dolly 30 to corresponding service lines on the tractor 20 when the respective chassis 24 and 32 are coupled in load sharing relationship and, upon uncoupling of the respective chassis, to automatically disconnect the lines. The lines on the tractor 20 corresponding to the lines 176, 178 and 180 are designated, respectively, by the numerals 176a, 178a and 180a. In the arrangement illustrated, these lines comprise, respectively: an "emergency" or main air supply line; a "service" or brake control line; and a cab control air line for the air cushions 122 on the dolly 30. Thus, when the respective chassis of the dolly and tractor are connected, air supply, brake control and suspension control lines for the dolly are established. Conversely, when the respective chassis of the tractor and dolly are disconnected from load sharing relationship, these lines are broken. Upon breaking of the lines, the valve assemblies 228 automatically close the lines 176a, 178a and 180a. At the same time, shuttle valves (not illustrated) close the lines 176, 178 and 180 to fluid flow.

From the dash lines in FIG. 13, it can be seen that the socket and probe elements of the service connection are maintained in alignment during coupling of the respective chassis 24 and 30 through the interrelationship of the sockets 100 and pins 102. It is also noted that, for purposes of illustration, FIG. 13 shows the cover 184 in the extended position. In actual practice, the cover 184 would assume the retracted position when the probe and socket elements are in separated condition either in preparation for connection, or immediately after disconnection. This results because air is only supplied to the cylinder 190 when the "emergency" line on the dolly is supplied with air from the tractor. As a result, when the dolly is not in use, the cover 184 normally assumes a retracted position exposing the heads 172. Upon coupling of the respective chassis 24 and 30 in load sharing relationship, the air supplied to the cylinder 190 from the "emergency" line forces the cover 184 into abutting engagement with the collars 222 of the socket elements (see FIG. 15).

It is here noted that only the dolly 30 is also provided with "glad-hand" type service connections (not illustrated) for the "emergency" and "service" lines. These connections are intended for use when the dolly is employed for hauling the rear trailer of a set of "doubles," or in other environments where the chassis 32 is uncoupled from load sharing relationship with the chassis 24. They provide for the supply of air to the dolly and for control of its brakes. When employed, they permit the aforedescribed leveling valve control of the air suspension system and automatically extend the cover 184 to a position shielding the heads 172. The latter operation is effected immediately upon establishment of the emergency air supply line to the dolly. It should be understood that, during the time the glad-hand connections are employed, the aforedescribed shuttle valves automatically close the lines leading to the probe elements 154 to fluid flow.

Fifth wheel support

For load supporting purposes, fifth wheels are mounted on both the chassis 24 and 32. The fifth wheel mounted on the chassis 24, designated by the numeral 238, is slidably supported on the frame members 62 and 64 for movement between a stored position adjacent the cab 22 (see FIG. 1) and a load carrying position (not illustrated) backed away from the cab. The latter position is employed when the tractor 20 is used without the dolly 30 coupled in load sharing relationship therewith. The fifth wheel mounted on the chassis 32, designated by the numeral 240, is slidably supported on the frame members 42 and 44 for movement between the solid and phantom line positions illustrated in FIG. 2. The solid line position is employed to impart total load to the chassis 32 when it is uncoupled from load sharing relationship with the chassis 24. The phantom line position is employed when the respective chassis are coupled in load sharing relationship to distribute the load therebetween. When the fifth wheel 240 is in the latter position, the fifth wheel 238 is moved to the stored position adjacent the cab 22.

The mounting structure for the fifth wheel 238 comprises: an angle member 242 fixed to and extending laterally from the frame member 62 and having longitudinally spaced apertures 244 formed in the upper flange thereof; an angle member 246 fixed to and extending laterally from the frame member 64 and having longitudinally spaced apertures 248 in the upper flange thereof; a plate 250 extending over the frame members 62 and 64 and the angle members 242 and 246 extending therefrom; a transverse trunnion support 252 fixed to the upper surface of the plate 250 and having the fifth wheel 238 mounted thereon for rocking movement relative thereto about a transverse axis; a plurality of pins 254 removably received in openings provided therefor in the lateral portions of the plate 250 for select engagement with the apertures 244 and 248 to lock the plate to the members 242 and 246 at select positions of longitudinal adjustment; and, a plurality of roller supports 256 mounted on the plate 250 for a rolling engagement with the intersecting surfaces between the respective angle members 242 and 246 and the frame members 62 and 64 from which they extend. The details of the roller supports, as will become more apparent from the subsequent discussion, may be seen from FIG. 11. In operation, the supports function to mount the fifth whel 238, when unloaded, for rolling movement over the chassis 24.

The mounting structure for the fifth wheel 240 corresponds substantially to that for the fifth wheel 238. Accordingly, for the sake of simplicity, the numerals used on the components of the structure for the fifth wheel 240 corresponding to those of the structure used for the wheel 238 are designated by like numerals, followed by the subscript $a$. The components of the mounting structure for the fifth wheel 240 may best be seen from FIG. 9 and comprise the following: an angle member 242a fixed to and extending laterally from the frame member 42 and having longitudinally spaced apertures 244a formed in the upper flange thereof; an angle member 246a fixed to and extending laterally from the frame member 44 and having apertures 248a formed in the upper flange thereof; a plate 250a extending over the frame members 42 and 44 and the angle members 242a and 246a; a trunnion support 252a fixed to the plate 250a and having the fifth wheel 240 mounted thereon for rocking movement about a transverse axis; a plurality of pins 254a removably received in apertures provided therefor in the plate 250a for select engagement with the apertures 244a and 246a to lock the plate 250a against longitudinal movement relative to the members 242a and 246a; a pair of first roller supports 256a mounted, respectively, on the plate 250a at either side of the rear end thereof; and, a pair of second roller supports 258 mounted, respectively, on the plate 250a at either side of the front end thereof. The roller supports 256a correspond identically in construction to the supports 256 and are positioned to roll over the surfaces defining the respective intersections between the members 42 and 242a and the members 44 and 248a. The second roller supports 258 are positioned, respectively, to roll over the members 42 and 44 and, upon coupling of the respective chassis in load sharing relationship, to roll over the juncture therebetween.

The prime purpose of the slidable mountings for the fifth wheels 238 and 240 is to permit shifting of the fifth wheel 240 to a position intermediate the axles for the wheels 28 and 38 when the respective chassis 24 and 32 are coupled in load sharing relationship. To achieve this function, it is simply necessary to first shift the fifth wheel 238 to the stored position adjacent the cab 22 and then shift the fifth wheel 240 to the desired intermediate position. Naturally, before the fifth wheels are shifted, the pins 254 and 254a must be disengaged to release the plates 250 and 250a, respectively, for slidable movement. Once the fifth wheels are positioned as desired, the pins are reinserted to lock the plate in place. In the latter condition, the pins 254a also act to further secure the respective chassis in coupled engagement. This results because the plate 250a and the pins 254a passing therethrough bridge the angle members on the respective chassis. It should be understood that the angle members 242 and 246 assume aligned end to end relationship with the angle members 242a and 246a. This interrelationship may be seen from the phantom line representation in FIG. 2.

The aforedescribed shifting operation of the fifth wheels is greatly facilitated by the roller supports 256, 256a and 258. These supports, in effect, suspend the fifth wheels for rolling movement over the frame members disposed therebeneath. Due to the construction of the supports, however, this suspension is only affected when the fifth wheels are unloaded. The latter characteristic has the advantage that it permits the support plates for the respective fifth wheels to seat firmly against the frame members thherebeneath when loaded.

The supports 258 and the mountings therefor correspond identically in construction. Accordingly, only one of the supports and the mounting therefor is illustrated in detail (see FIG. 10) and like numerals are employed to designate corresponding components of the respective supports. Each support 258 comprises: a fulcrum post 260 fixed to and extending upwardly from the plate 250a; a fulcrum lever 262 mounted on the post 260 for rocking movement relative thereto by a pin 264; a bifurcated end 266 formed on the lever 262 in laterally spaced relationship to the plate 250a; a stop end 268 formed on the lever 262 above the plate 250a; an elongated roller 270 journalled between the end portions of the bifurcated end 266 by a bolt 272; an adjustable stop bolt 274 threadably received in the end 268; a spring post 276 fixed to and extending upwardly from the plate 250a; and, a compression coil spring 278 received around the post 276 in interposed relationship between the plate 250a and the lower end of the stop bolt 274. Through the foregoing arrangement, the roller 270 of each of the supports 258 is resiliently biased against any frame member disposed therebeneath. The resilient force imparted to each roller results from the spring 278 cooperating therewith and is adjusted, through the stop bolt 274, to lift the plate 250a when the fifth wheel mounted thereon is unloaded. Loading of the fifth wheel functions to deflect the spring 278a to permit the plate 250a to seat in engagement with the frame members disposed therebeneath.

As noted in the foregoing discussion, the support members 256 and 256a correspond identically to each other in construction and operation. For this reason, only one of the supports is illustrated (see FIG. 11) and like numerals are employed to designate corresponding components of the respective supports.

Referring now to FIG. 11, the support 256a illustrated therein comprises: a tubular housing 280 fixed to and extending through an opening 282 provided therefor in the plate 250a; an inwardly crimped portion 284 formed on the lower end of the housing 280; an internally threaded portion 286 formed on the upper end of the housing 280; a ball 288 loosely received within the housing 280 in abutting sliding engagement with the crimped portion 284; a bearing 290 of generally annular configuration received in the housing 280 above and in abutting engagement with the ball 288; a stop bolt 292 threadably received within the portion 286; and, a compression coil spring 294 interposed between the bearing 290 and bolt 292. Through this arrangement, the spring 294 functions to bias the ball 288 into engagement with any frame members disposed therebeneath. In adjusted condition, the ball is biased downwardly with sufficient force to lift the plate 250a when the fifth wheel mounted thereon is unloaded. Similarly to the operation of the supports 258, this force is insufficient to prevent the plate 250a from seating with the frame members therebeneath when the fifth wheel mounted thereon is loaded. Adjustment of the spring 294 is readily effected through the stop bolt 292. In the preferred embodiment, the bearing 290 is fabricated of a material having a low coefficient of friction, such as Teflon.

FIG. 12 illustrates a roller support, designated by the numeral 256b, which may be substituted for the supports 256 or 256a. The support 256b corresponds identically in function to the supports 256 and 256a and differs therefrom in construction only in that it employs a modified roller and bearing arrangement. For this reason, elements of the support 256b corresponding to the aforedescribed support 256a are designated by like numerals. The roller and bearing arrangement employed in the support 256b comprises: a sleeve 296 slidably received within the housing 280 beneath and in engagement with the spring 294 for abutment with the crimped portion 284; a journal shaft 298 mounted in and extending through the sleeve 296; and, an annular roller 300 rotatably mounted on the shaft 298 by a pair of ball bearings 302. The roller 300 is biased downwardly by the spring 294 similarly to the ball 288. In this operation, spring force is imparted to the roller through the sleeve 296 and the shaft 298.

Summary of use

From the foregoing description, the overall construction and operation of the invention is believed apparent. It is emphasized that the invention provides for the ready employment of the dolly 30 either as a load sharing accessory for the tractor 20, or as a conventional independent dolly support. When used as a load sharing accessory, the air suspension system for the dolly provides for the selective loading of its wheels and the drive wheels 28 on the tractor. During employment of the dolly as a conventional independent support, the air suspension system provides for automatic leveling of the load carried thereby.

Figure 2:
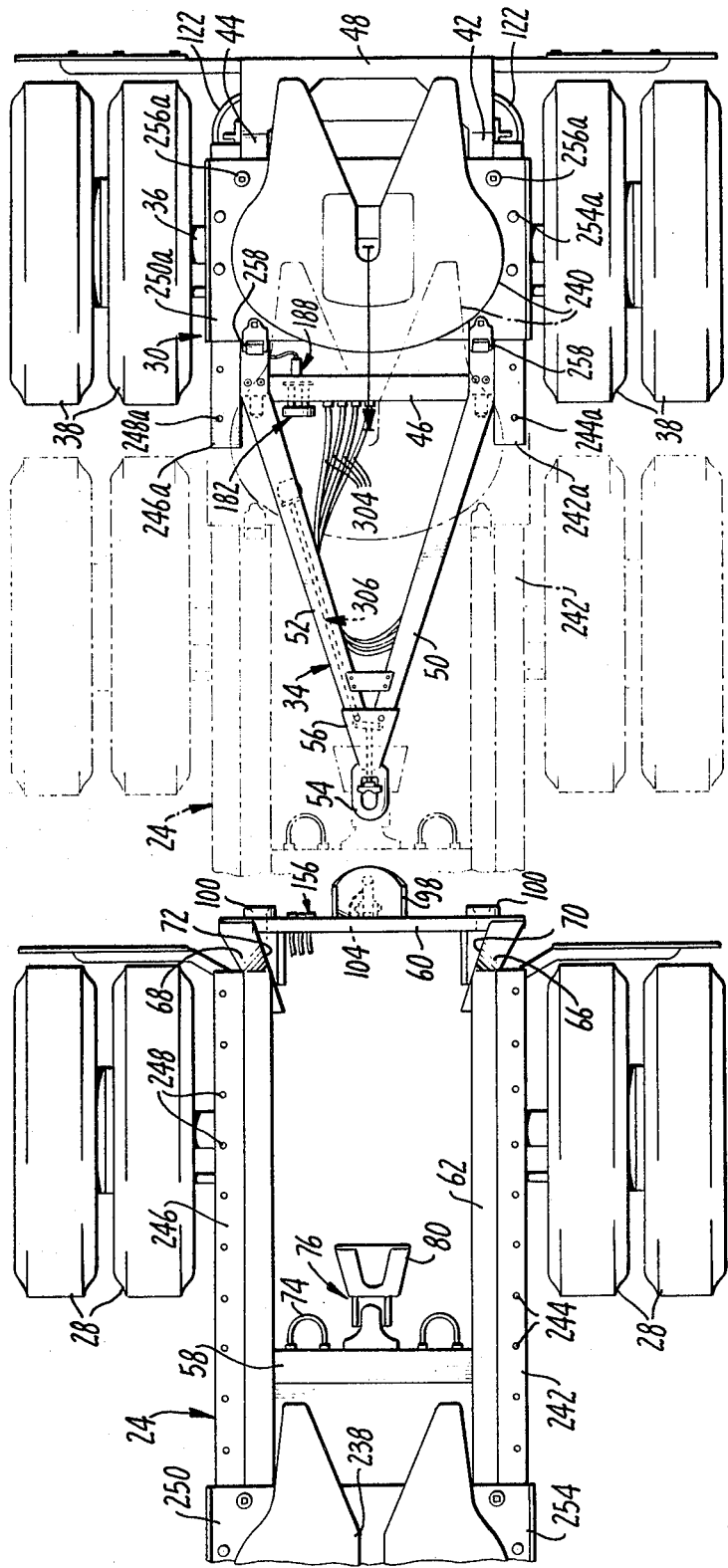
FIG. 2 is a plan view illustrating the tractor mounted components and dolly of the assembly associated as shown in FIG. 1, with a phantom line representation illustrating the position the tractor mounted components assume when engaged with the dolly.

It is here noted that FIG. 2 illustrates the "glad-hand" connectable air lines for the dolly 30. These lines are designated by the numeral 304 and, as illustrated, are in disconnected inoperative condition. When in use, the four lines 304 illustrated provide for establishment of "emergency" and "service" circuits to the dolly from a leading vehicle and from the dolly to a trailing vehicle. As thus employed, two of the lines are coupled to the leading vehicle and two are coupled to the trailing vehicle.

The drawings and particularly FIGS. 7 and 8, also illustrate a pneumatically operated rattle preventing device for the eye 54. This device is designated in its entirety by the numeral 306 and comprises: an air motor 308 mounted on the lateral member 52 of the tongue 34 by a bracket 310; an actuating rod 312 connected to the motor 308 for extension thereby upon the supply of air to the motor; a crank 314 pivotally secured between the end of the rod 312 opposite that connected to the motor 308 and the lateral member 50; a push rod 316 extending slidably through the body of the eye 54 and into the aperture provided therein; and, a shoe 318 fixed to the rod 316 within the aperture of the eye for slidable movement to and from engagement with a pintle hook engaged therein. While not illustrated, it is to be understood that the motor 308 is provided with spring retracting means to normally retract the rod 312 when the air supply to the motor is cut off.

The air motor 308 is connected (not illustrated) in fluid communication with the "emergency" air supply circuit of the dolly 30. Accordingly, whenever air is supplied to the circuit, either through the self-coupling service connection or the glad-hand connections, the motor is activated. Upon activation, the motor 308 extends the rod 312 to move the lever 314 and rod 316 forwardly. The latter operation, in turn, moves the shoe 318 forwardly within the aperture of the eye 54 to a rattle preventing position. In the latter position, the shoe is located to engage a pintel hook received within the aperture of the eye. As a result of this overall arrangement, the supply of air to the "emergency" air circuit of the dolly functions to automatically move the shoe 318 to the rattle preventing position. Conversely, when the supply of air to the circuit is broken, the spring retracting means within the motor 308 functions to automatically retract the shoe 318 from the rattle preventing position.

While a preferred embodiment of the invention has been illustrated and described, it is to be understood that the invention is not intended to be limited to the details of this embodiment, but rather is defined by the accompanying claims.

What is claimed is:

1. In combination with a wheel supported draft vehicle having a load supporting chassis and a vehicular semi-trailer having a draft connection at the forward end thereof and support wheels at the rearward end thereof, an improved load distributing assembly for coupling the chassis of the draft vehicle in load supporting relationship to the semi-trailer comprising:

(a) dolly having a chassis supported on a wheel supported axle in substantially coplanar relationship with the chassis of the draft vehicle by selectively variable load supporting suspension means comprising:

(1) inflexible generally arcuate trailing arms pivotally mounted on the chassis of the dolly for pivotal movement about an axis extending transversely across said chassis at a position spaced forwardly and above said axle, said arms extending rearwardly from said axis so as to have the rearward ends thereof disposed beneath the level of said axle;

(2) means securing the intermediate portions of said arms in supporting relationship to said axle; and, (3) selectively inflatable air cushions mounted, respectively, in compression between the rearward ends of said arms and the underside of said chassis;

(b) a draft tongue joined to and extending forwardly from the chassis of the dolly;

(c) an open rearward end formed on the chassis of the draft vehicle for receipt of said tongue;

(d) mutually engageable forwardly converging surfaces on both said tongue and rearward end, said surfaces being adapted to assume mutual engagement upon receipt of said tongue in said end to limit movement of said respective chassis toward each other and prevent relative lateral movement therebetween;

(e) pin means and socket means mounted, respectively, on said respective chassis to either side of the longitudinal centerlines thereof, said means being adapted to assume mutual engagement upon receipt of said tongue in said end to prevent relative elevational movement between said respective chassis;

(f) coupling means mounted on the respective chassis in forwardly spaced relationship to the converging lateral surfaces thereon said means being adapted to assume mutual engagement to maintain said tongue in received condition within said end and being selectively operable to release said tongue from said condition; and, (g) a draft connection adapted to be fixedly supported on and between the respective chassis of the draft vehicle and dolly when said tongue is received in said open end, said connection being adapted to be coupled in engagement with the draft connection of the semi-trailer to support the forward end of the trailer.

2. An improved load distribution assembly according to claim 1, wherein the draft connection adapted be fixedly supported on and between the respective chassis of the draft vehicle and dolly comprises a fifth wheel disposed on the chassis of the dolly for movement thereover to and from a position extending partially over the chassis of the draft vehicle, said fifth wheel, being supported by an apparatus comprising:

(a) plate means having the fifth wheel mounted thereon for support thereby, said plate means extending over the chassis of the dolly;

(b) roller means carried by said plate means for rolling engagement with the upper sides of the respective chassis therebelow; and, (c) resilient means operatively associated with said plate and roller means to urge said roller means downwardly relative to said plate means, said resilient means cooperating wtih said plate and roller means to:

(1) urge said roller means to a position lifting said plate means when the fifth wheel is unloaded whereby, when unloaded, said plate means is supported by said roller means in an elevated position above the respective chassis therebelow; and, (2) permit said roller means to retract from the position lifting said plate means when the fifth wheel is loaded whereby, when loaded, said plate means rests on the respective chassis therebelow.

3. An improved load distributing assembly according to claim 2, further comprising a service connection for automatically coupling service lines on the respective chassis upon receipt of said tongue in said open end, said connection comprising:

(a) mateable socket and probe means mounted, respectively, on said respective chassis, said means having service lines connected thereto and being:

(1) positioned to assume mating condition upon mutual engagement of said coupling means; and, (2) adapted, upon assumption of the mating condition, to establish communication between the service lines connected thereto;

(b) first sealing means operatively associated with said socket means to substantially close said socket means to the entry of foreign matter upon removal of said probe means from mating condition therewith and being adapted to permit the substantially unrestricted movement of said probe means into mating condition with said socket means; and, (c) second sealing means operatively associated with said probe means, said means being adapted to permit the substantially unrestricted movement of said probe means into mating condition with said socket means and being selectively operable to substantially close said probe means to the entry of foreign matter when said probe and socket means are removed from mating condition.

4. In combination with a leading vehicle having a load supporting chassis adapted to be connected with the chassis of a dolly, a connection for coupling said vehicle and dolly chassis comprising:

(a) a draft tongue joined to and extending forwardly from the chassis of the dolly, said tongue having forwardly converging exterior lateral surfaces adjacent the juncture thereof with said chassis;

(b) an open rearward end formed on the chassis of the leading vehicle for receipt of said tongue, said end having forwardly converging interior lateral surfaces adjacent the rearmost portion thereof adapted, upon receipt of said tongue in said end, to assume mutually engaged abutting relationship with the lateral surfaces of said tongue to limit movement of said respective chassis toward each other and substantially prevent relative lateral movement therebetween;

(c) pin means and socket means mounted, respectively, on said respective chassis to either side of the longitudinal centerlines thereof, said means being adapted to assume mutual engagement upon receipt of said tongue in said end to prevent relative elevational movement between said respective chassis; and, (d) coupling means mounted on the respective chassis in forwardly spaced relationship to the converging lateral surfaces thereon said means being adapted to assume mutual engagement to maintain said tongue in received condition within said end and being selectively operable to release said tongue from said condition.

5. An improved connection according to claim 4, wherein:

(a) the coupling means mounted on the chassis of the dolly is disposed at the forward distal end of said tongue;

(b) the coupling means mounted on the chassis of the leading vehicle is disposed on a member fixed to and extending transversely of said chassis;

and further comprising a guide mounted on the chassis of the leading vehicle immediately adjacent the coupling means mounted thereon, said guide being adapted to engage and direct the coupling means mounted on the chassis of the dolly into engagement with the coupling means mounted on the chassis of the leading vehicle upon movement of said tongue into received condition in said open end.

6. In combination with a leading vehicle having a load supporting chassis adapted to be connected with the chassis of a dolly, a connection for coupling said vehicle and dolly chassis comprising:

(a) a draft tongue fixed to and extending forwardly from the chassis of the dolly, said tongue having forwardly converging exterior lateral surfaces adjacent the juncture thereof with said chassis;

(b) an open rearward end formed on the chassis of the leading vehicle for receipt of said tongue, said end having forwardly converging interior lateral surfaces adjacent the rearmost portion thereof adapted, upon receipt of said tongue in said end, to assume mutually engaged abutting relationship with the lateral surfaces of said tongue to limit movement of said respective chassis toward each other and substantially prevent relative lateral movement therebetween;

(c) pin means and socket means mounted, respectively, on said respective chassis to either side of the longitudinal centerlines thereof, said means being adapted to assume mutual engagement upon receipt of said tongue in said end to prevent relative elevational movement between said respective chassis; and, (d) coupling means mounted on the respective chassis, said means being adapted to assume mutual engagement to maintain said tongue in received condition within said end and secure the forward end of said tongue against substantial movement relative to the chassis of the leading vehicle, and being selectively operable to release said tongue from said condition.

7. In combination with a wheel supported draft vehicle having a load supporting chassis and a vehicular semi-trailer having a draft connection at the forward end thereof and support wheels at the rearward end thereof, an improved load distributing assembly for coupling the chassis of the draft vehicle in load supporting relationship to the semi-trailer comprising:

(a) dolly having a chassis supported on a wheel supported axle in substantially coplanar relationship with the chassis of the draft vehicle by selectively variable load supporting suspension means comprising:
   (1) a pair of trailing arms mounted on the chassis of the dolly, said arms each being mounted for pivotal movement about an axis extending generally transversely across said chassis at a position spaced forwardly of said axle and having a rearward end disposed rearwardly of the axis of pivotal movement therefor;
   (2) means securing said arms in supporting relationship to said axle; and,
   (3) selectively inflatable air cushions mounted, respectively, in compression between the rearward ends of said arms and the underside of said chassis;

(b) a draft tongue fixed to and extending forwardly from the chassis of the dolly;

(c) an open rearward end formed on the chassis of the draft vehicle for receipt of said tongue;

(d) mutually engageable forwardly converging surfaces on both said tongue and rearward end, said surfaces being adapted to assume mutual engagement upon receipt of said tongue in said end to limit movement of said respective chassis toward each other and substantially prevent relative lateral movement therebetween;

(e) pin means and socket means mounted, respectively, on said respective chassis to either side of the longitudinal centerlines thereof, said means being adapted to assume mutual engagement upon receipt of said tongue in said end to prevent relative elevational movement between said respective chassis;

(f) coupling means mounted on the respective chassis said means being adapted to assume mutual engagement to maintain said tongue in received condition within said end and secure the forward end of said tongue against substantial movement relative to the chassis of the leading vehicle, and being selectively operable to release said tongue from said condition; and, (g) a draft connection adapted to be fixedly supported on and between the respective chassis of the draft vehicle and dolly when said tongue is received in said open end, said connection being adapted to be coupled in engagement with the draft connection of the semi-trailer to support the forward end of the trailer.

8. In combination with a leading vehicle having a load supporting chassis and a dolly having a chassis adapted to be coupled in tandem substantially fixed load sharing relationship with the chassis of the leading vehicle, a connection for automatically coupling service lines on the respective chassis upon the coupling thereof in load sharing relationship, said connection comprising:

(a) mateable socket and probe means mounted, respectively, on said respective chassis, said means having service lines connected thereto and being:
   (1) positioned to assume mating condition upon coupling of said respective chassis; and,
   (2) adapted, upon assumption of the mating condition, to establish communication between the service lines connected thereto;

(b) first sealing means operatively associated with said socket means to substantially close said socket means to the entry of foreign matter upon removal of said probe means from mating condition therewith and being adapted to permit the substantially unrestricted movement of said probe means into mating condition with said socket means; and, (c) second sealing means operatively associated with said probe means, said means being adapted to permit the substantially unrestricted movement of said probe means into mating condition with said socket means and being selectively operable to substantially close said probe means to the entry of foreign matter when said probe and socket means are removed from mating condition.

9. An apparatus for mounting a fifth wheel for selective slidable movement over a support chassis therefor, said apparatus comprising:

(a) plate means having the fifth wheel mounted thereon for support thereby, said plate means extending over said chassis;

(b) roller means carried by said plate means for rolling engagement with the upper side of the chassis; and, (c) resilient means operatively associated with said plate and roller means to urge said roller means downwardly relative to said plate means, said resilient means coperating with said plate and roller means to:
   (1) urge said roller means to a position lifting said plate means where the fifth wheel is unloaded whereby, when unloaded, said plate means is supported by said roller means in an elevated position above the chassis; and,
   (2) permit said roller means to retract from the position lifting said plate means when the fifth wheel is loaded whereby, when loaded, said plate means rests on the chassis.

10. An apparatus according to claim 9, wherein:
(a) the roller means comprise, at least in part, balls rotatably mounted on said plate means for extension therethrough into engagement with the chassis; and,
(b) the resilient means operatively associated with the roller means comprised of said balls comprise a bearing mounted on said plate means above each of said balls for sliding engagement therewith and compression spring means urging each of said bearings downwardly into engagement with ball therebelow.

11. An apparatus according to claim 9, wherein:
(a) the roller means comprise, at least in part, axle supported rollers mounted on said plate means for extension therethrough into engagement with the chassis; and,
(b) the resilient means operatively associated with the roller means comprised of said rollers comprise a bearing mounted on said plate means above each of said rollers and in engagement with the axle thereof and compression spring means urging each of said bearings downwardly.

12. An apparatus according to claim 9, wherein:
  (a) the roller means comprise, at least in part:
    (1) levers fulcrumed to said plate means, said each having one end extending over said plate means and the other extending outwardly therefrom; and,
    (2) a roller rotatably carried by the outwardly extending end of each of said levers in rolling engagement with the chassis;
  (b) the resilient means operatively associated with the roller means thus comprised comprise compression spring means interposed between said plate means and the end of each of said levers extending over said plate means.

References Cited

UNITED STATES PATENTS

| | | | |
|---|---|---|---|
| 2,466,938 | 4/1949 | Evans | 280—418 |
| 3,163,306 | 12/1964 | Bennett et al. | 214—515 |
| 2,589,678 | 3/1952 | De Lay | 280—407 X |
| 2,733,931 | 2/1956 | Reid et al. | 280—421 X |
| 2,827,282 | 3/1958 | Weiss | 267—15 |
| 3,081,109 | 3/1963 | Davies | 280—124 X |
| 3,197,237 | 7/1965 | Smith | 280—415 |
| 3,203,711 | 8/1965 | Chew | 280—415 |
| 3,246,912 | 4/1966 | Chuna | 280—407 |
| 3,246,913 | 4/1966 | Darling | 280—418 |
| 3,269,418 | 8/1966 | Jackson et al. | 267—15 X |
| 3,282,601 | 11/1966 | Harbers | 280—81 |
| 3,332,701 | 7/1967 | Masser | 267—15 X |
| 3,347,563 | 10/1967 | Harbers | 280—415 |
| 3,391,950 | 7/1968 | Carter et al. | 280—421 |

FOREIGN PATENTS

| | | |
|---|---|---|
| 780,552 | 8/1957 | Great Britain. |
| 978,107 | 12/1964 | Great Britain. |

LEO FRIAGLIA, Primary Examiner

U.S. Cl. X.R.

137—322; 280—124, 415, 418, 421